United States Patent [19]
Sloyan

[11] 3,893,646
[45] July 8, 1975

[54] OSCILLATION ABSORBING MOTOR BASE
[76] Inventor: Jerome J. Sloyan, c/o Automatic Motor Base Co., Windsor, N.J. 08561
[22] Filed: Mar. 27, 1974
[21] Appl. No.: 455,366

[52] U.S. Cl. .......................... 248/23; 74/242.13 A
[51] Int. Cl.² ................................................ F16M 3/00
[58] Field of Search..... 248/23, 358 AA; 74/242.15, 74/242.12, 242.13 A, 242.13 R; 267/61 R, 174, 175, 176

[56] References Cited
UNITED STATES PATENTS

| | | | |
|---|---|---|---|
| 2,125,004 | 7/1938 | Hamerstadt............................ | 248/23 |
| 2,387,264 | 10/1945 | Holland................................ | 267/61 R |
| 2,762,661 | 9/1956 | Sloyan ................................ | 248/23 X |
| 2,762,662 | 9/1956 | Sloyan ................................ | 248/23 X |
| 2,833,597 | 5/1958 | Sloyan ................................ | 248/23 X |
| 2,833,598 | 5/1958 | Sloyan ................................ | 248/23 X |
| 2,892,624 | 6/1959 | Keysor............................... | 267/61 R |
| 3,411,591 | 11/1968 | Roll et al. ........................ | 267/174 X |
| 3,586,273 | 6/1971 | Sloyan ................................ | 248/23 |
| 3,727,902 | 4/1973 | Burckhardt et al........... | 267/61 R X |
| 3,814,358 | 6/1974 | Sloyan ................................ | 248/23 |

*Primary Examiner*—J. Franklin Foss

[57] ABSTRACT

A motor base having a carriage capable of severe oscillation forwardly and rearwardly and provided with spring means for exerting resilient reaction contra to tension of the belt which extends between the driving and driven pulleys respectively on the motor and driven mechanism, characterized by a proportionately small compression of the spring means being utilized compared to the relatively long length of the spring means, obtaining substantially invariable gentle resilient actuation contra to the belt tension throughout the oscillation.

5 Claims, 5 Drawing Figures

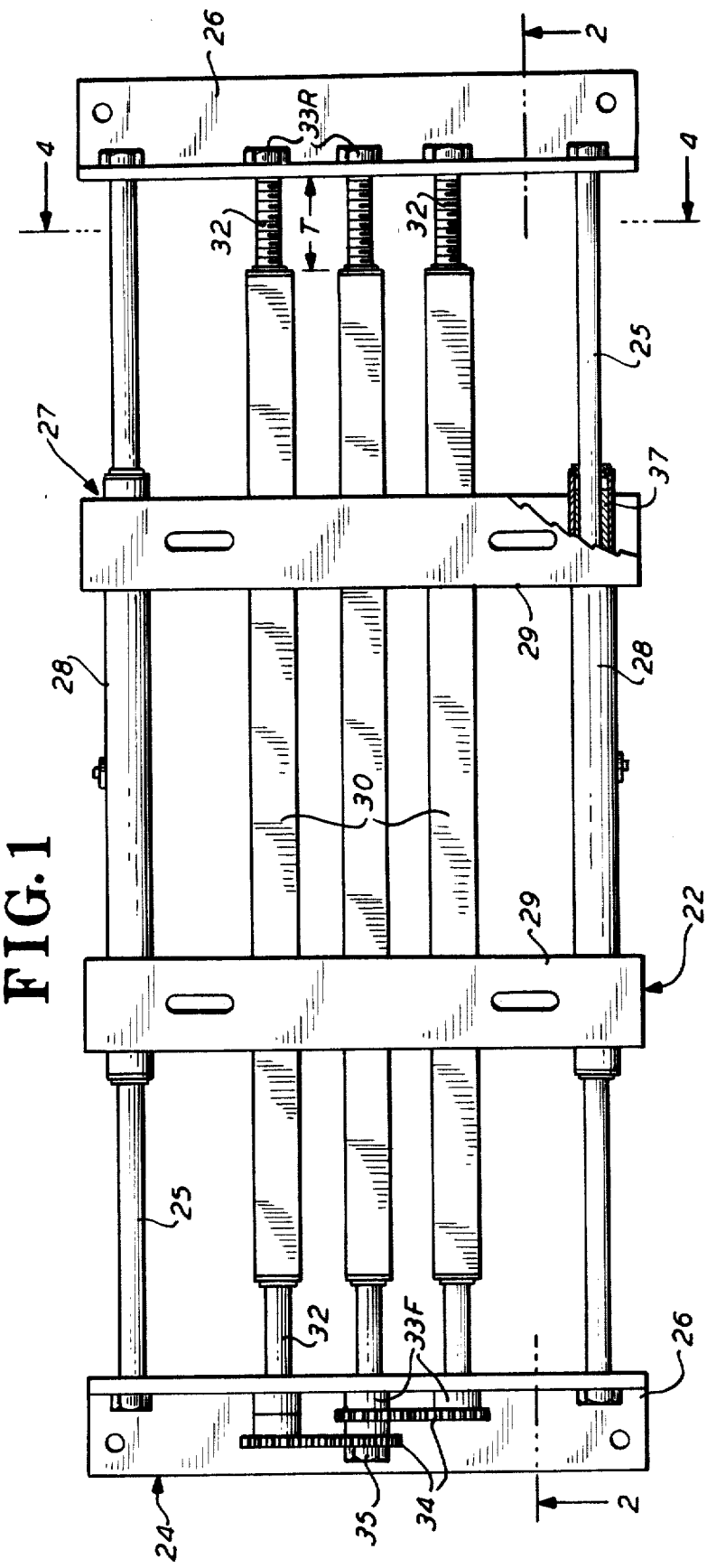
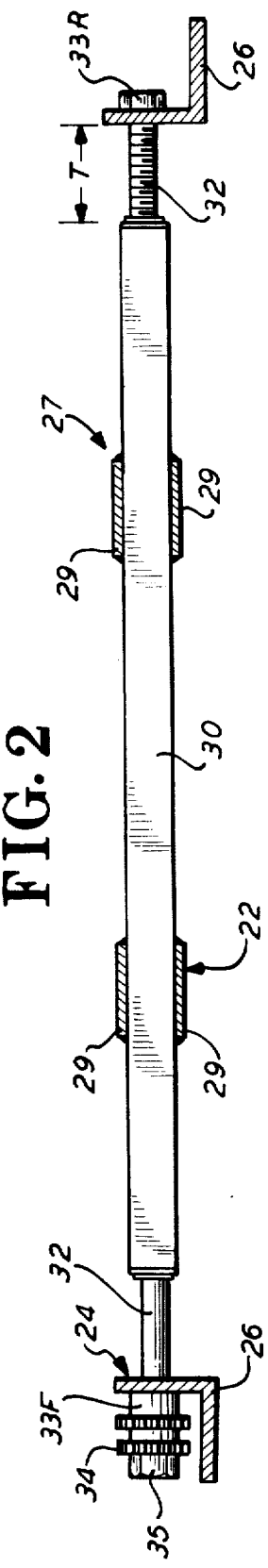

OSCILLATION ABSORBING MOTOR BASE

The invention herein disclosed is an improvement of the construction set forth in my U.S. Pat. No. 3,814,358 June 4, 1974.

THE PROBLEM

The art is repleat with examples of motor bases providing spring-actuated carriages by which the driving belt from the motor to the driven mechanism is kept taut during normal operation. These prior art constructions utilize springs operating in the region of their usual rated permissable compression. This method of maintaining the belt taut has proved successful with equipment in which the driven mechanism is smooth running.

But in certain equipment wherein the driven mechanism introduces severely oscillating movement, the motor pulley and carriage must be permitted to respond to said oscillation, and yet the proper amount of tension must be maintained on the belt. In prior art arrangements, which are adapted to smooth-running equipment, only when the load is increased is there any increase in the amount the spring is compressed beyond that necessary to resist the normal load; amd that increase represents only a small increment of the overall length of the spring. If a motor base with the spring arrangement of the prior art, just described, were to be applied to equipment which inherently and necessarily develops severe oscillations, such a base would be a total failure because the amount of deflection due to the oscillation would be far in excess of such a spring could take. As a result, the spring would "bottom" (i.e., the convolutions would come into contact with each other) and hence the elasticity of the spring would be nullified. When the spring has bottomed, there can be no further movement of the carriage, but the oscillating movement continues, with result that the belt or some other vulnerable part of the equipment breaks.

In this connection it may be explained that a spring operating from no compression toward maximum compression increases its developed resilient force progressively and in that interval attains a normal rated compression of permitted amount not injurious to its resilient capabilities. Going beyond that point becomes increasingly injurious to the spring. In prior art constructions the oscillations that would occur in periods of spring compression when the spring is already functioning under its normal compression introduces increased and detrimental abnormal tension needed to absorb the oscillations, even before bottoming takes place will cause a severe rebound in the return stroke of the oscillation of the carriage developing a pronounced and quick lessening of belt tension, causing belt slippage and ware, and frequent jumping of the belt from the equipment pulleys. Furthermore, such excessive abnormal compression of the spring tends to strain it beyond its elastic limit, causing the spring to deteriorate.

SOLUTION OF THE PROBLEM

The problem encountered by attempted use of prior art construction of motor bases is agreeably overcome by utilization of the herein disclosed invention. In its broadest aspect, the invention proposes a construction that effectuates use of the belt tensioning spring in a region below its point of normal rated capacity well below the high compression region. This restriction of primary tensioning the belt in the low-compression region of the spring operation enables the spring to still be operating within its normal rating area of compression when encountering and absorbing the super-posed oscillations.

This arrangement therefore eliminates undesirable excessive return force actuating the carriage in the oscillating cycle. Highly beneficial results are obtained by the gentle action delivered by the use of the spring in its low-compression range. If found desirable or necessary, a plurality of co-extensive parallel springs, all operating in their low-compression region may be employed for equipment requiring more of the gentle tensioning force than available from a single spring that is restricted in range of permissible compression.

DRAWINGS

The invention is illustrated by way of example in the accompanying drawings, wherein FIG. 1 is a plan of a motor base embodying the invention, and in this instance having two rails and three actuating springs;

FIG. 2 is a longitudinal vertical sectional view of the motor base taken on a plane designated by line 2 — 2 in FIG. 1;

DESCRIPTION

Figure 5:
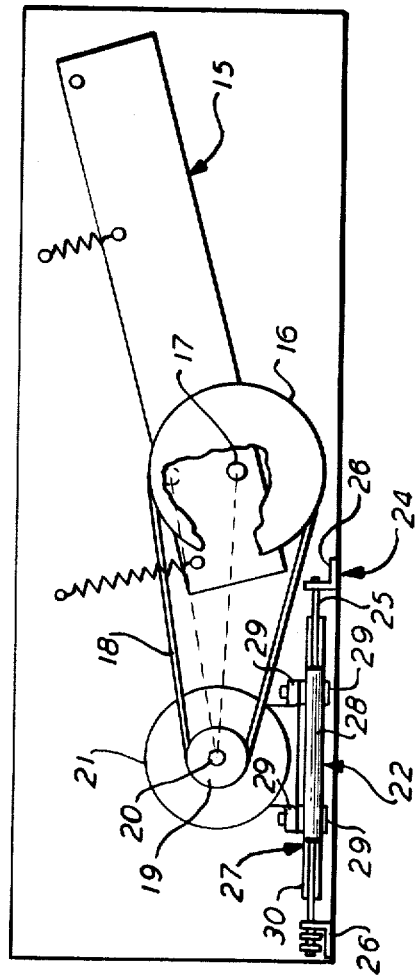
FIG. 5 is a side elevation of a complete equipment including a motor on a motor base of this invention driving an oscillating producing mechanism.

One possible equipment assembly as illustrated in FIG. 5, may include a driven mechanism 15 having a driven pulley 16 fixed on a driven shaft 17. The mechanism herein shown is indicative of any one of numerous machines operation of which by driving its shaft 17 will result in severe vibration, gyration or other transitory motion (herein, for brevity, grouped under the single term "oscillation") necessarily present for a useful purpose, but unfortunately transmitted to the motor. Examples of such machines are sifters, hopper agitators, casting cleaners, sand removers from casting flasks, cement, paint and other mixers, and a long list of other mechanisms too numerous to include here. Pulley 16 is driven by a belt 18 from a driving pulley 19 on a motor shaft 20 of a motor 21 mounted on a motor base 22 of the present invention. It will be recognized that the general assembly of the equipment is in some respects much the same as shown in my above-mentioned patent. The difference lies in the construction and operation of the motor base.

Directing attention to the motor base 22, a rigid basal body portion 24 is provided that can be securely bolted to the floor or elsewhere in fixed position. This body portion includes a pair of co-extensive parallel rod-like cylindrical rails 25 located at opposite sides of the body portion and secured at their forward and rearward ends to transverse headers 26 that constitute the ends of said body portion.

Slidably carried by said rails 25, is a carriage 27 provided with tubular gliders 28 respectively receiving said rails 25 coaxially therein. Cross members 29, above and below and transverse to the gliders, are welded thereto, the cross members having size, location and strength permitting a standard motor 21 to be bolted thereto with its shaft 20 extending in a direction transverse to the gliders so that its pulley 19 will be at the side of the motor base. The gliders have a length substantially of a dimension corresponding to the distance from front to back of the cross-members. Suitable bearings 37 are provided within the gliders and provide a sliding fit on the rails.

Also as an integral rigid part of the carriage 27 there is at least one cross-sectionally square hollow housing tube 30 fixed in parallelism to and between the gliders by being welded to the cross-members. Within the housing tube there is a longitudinal coil spring 31 the length of which in non-compressed condition is substantially the length of its housing tube 30. Possible latitude of the movement of the carriage permissible, (but not fully utilized) is designated by distance T. That distance is more than sufficient to accomodate the maximum reciprocation imposed by the initial belt tensioning and the subsequent severest oscillations encountered. However, in permitting such novement of the carriage the spring still is not compressed unduly, at most not being reduced in length more than 30 but preferably 20% and in any event below the normal compression rating for the spring.

It may now be called to attention that the housing tube 30, and likewise the contained spring 31, are considerably longer than the spacing from front to rear of the cross-members 29, and therefore project well in front of and to the rear of said cross-members. As shown in FIG. 1, said housing tube has a length substantially double the said spacing and thereby allows for extra length of spring. Thus a structure is provided which enables employment of a spring having a long compressability capability such that the force it exerts will not vary more than 25% during any period of oscillation of the carriage, and further, that the maximum deflection to which it will be subjected will not exceed 30% of its non-compressed length. This construction and operation confines compression to the region of minimum compression of the spring with a developed resilient force in use well within the normal compression rating capacity of the spring. Thus the spring is capable of exerting a force to provide the amount of tension on the belt to transmit the power required, but when further compression takes place due to oscillation of the carriage, the force it will then exert will not effect a sufficient increase in tension which would result in damage to the belt. The non-used portion of the possible compressability of the spring far exceeds the actually used portion of the compressability length needed for normal belt tensioning and for meeting and overcoming the severe oscillations.

Figure 3:
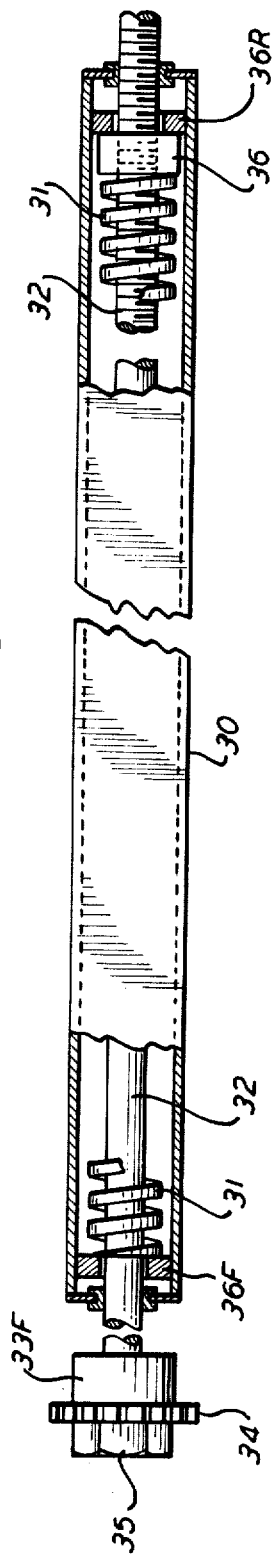
FIG. 3 is a longitudinal side elevation of one of the spring housing tubes, partly broken away so as to display the interior thereof.
Figure 4:
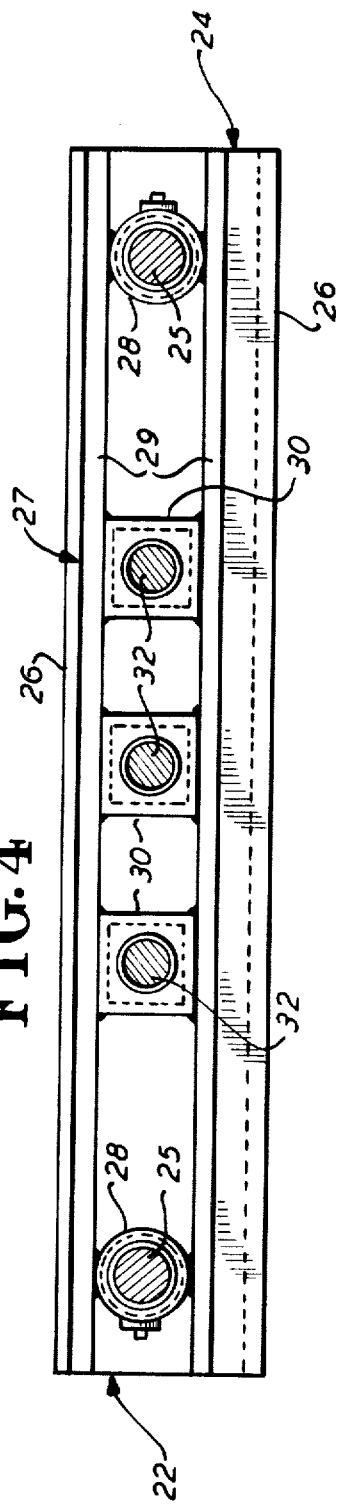
FIG. 4 is a transverse vertical sectional view taken on a plane designated by line 4 — 4 in FIG. 1.

Longitudinally within housing tube 30, or each of them, and projecting at both ends thereof, is a rod, herein designated as screw-rod 32 since it is appropriately screw-threaded for an adequate portion of its length inwardly from its rear end well within the housing tube as shown in FIG. 3. This screw-rod 32 is coaxial with spring 31 and obviously of greater length than said spring so as to project to and through the fixed headers 26 of the basal body portion 24, and rendered immovable in a longitudinal direction by rear and front head and collar 33R and 33F respectively fixed thereon and located in juxtaposition to the outer faces of said headers. If so desired, where two or more springs and spring-housings with accompanying screw-rods are employed, sprocket wheels and chain 34 for said screw-rods may be incorporated in the structure to secure unison of rotation. A control nut or head 35 fixed on the forward end of at least one screw-rod 32 as a means for rotating the same manually if and when adjustment of tension or carriage position forwardly or rearwardly is required.

Within the housing tube 30 in threaded engagement with the threaded portion of screw-rod 32, is a spring tensioning or follower nut 36 having an outer contour matching the inner shape of the housing tube so as to be slidable but non-rotatable therein. One end of spring 31 bears against the follower nut 36 which therefore may apply desired compression by rotation of the screw-rod 32 and consequently sliding of said tensioning or follower nut.

Also within housing tube 30 and close to the front and rear ends thereof are front and rear abutments 36F and 36R respectively. These abutments have a size and shape to fit within the tube and are welded in place. Each abutment has a central hole for passage of the screw-rod 32 therethrough. The front abutment 36F is engaged by and receives pressure from spring 31 during operation, so the carriage will tend to move in a direction away from the driven mechanism 15, whereas the rear abutment 36R is engageable by the movable tensioning or follower nut 36 which can be backed up against it to relieve tension on the belt whereby positive retracting movement of the motor is effected, when, for instance, a change or replacement of the belt is desired. Thus in all aspects of construction and operation the motor base of this invention will perform readily and successfully and more effectually than prior art constructions especially with equipment involving unavoidable oscillation. As a final word, let it be said that what appears at first glance to be unnecessarily long springs, is in fact discovered to be of great importance and benefit and the key to solution of the problem involved.

I claim:

1. A motor base for absorbing equipment oscillations, comprising a basal body portion capable of being secured in a fixed position and having parallel rails extending from front to rear thereof, a carriage slidably mounted on said rails adapted to be moved forwardly and rearwardly a limited distance commensurate with the normal belt-tightening function of the spring and with the imposed oscillations, and a spring positioned and retained continuously under pressure providing a forwardly acting work stroke urging said carriage in a forward direction throughout said limited distance, said spring having a compressability range in excess of its said work stroke and in excess of said limited distance of movement of the carriage, thereby restricting the used spring pressure to initial low-pressure range of the spring compression without involving use of maximum high pressure range of compression of said spring.

2. A motor base in accordance with claim 1, wherein said spring is compressed in use only up to a maximum of 30% reduction in spring length.

3. A motor base in accordance with claim 1, wherein said spring has a length in non-compressed condition of at least 18 times greater than the permitted oscillating movement of the carriage.

4. A motor base in accordance with claim 1, wherein said spring has a compressive length to accept compression for normal belt tensioning and to accept an additional compression for absorbing imposed oscillations wherein the compression due to said oscillations is an amount under 25% additional to said normal belt tensioning compression.

5. A motor base in accordance with claim 1, wherein said carriage has motor supporting cross means extending from side to side of the carriage and forwardly and rearwardly thereof to extreme front and rear edges with spacing therebetween providing a motor supporting area commensurate with the size of motor to be attached thereto, a housing tube for said spring in parallelism to said rails and fixed with respect to said cross means and projecting therebeyond perpendicularly to said edges, both said tube and spring having a length at least 50% greater than said spacing between the front and rear edges of said cross means.

* * * * *